United States Patent [19]

McClellan et al.

[11] Patent Number: 5,665,785

[45] Date of Patent: Sep. 9, 1997

[54] PROCESS FOR FORMING MICROCELLULAR STRUCTURES HAVING AN INTEGRAL SKIN AND PRODUCTS THEREOF

[75] Inventors: Thomas Roy McClellan, Mission Viejo; John T. Mizulo, Irvine; Edwin S. Nelson, North Hollywood; Grant R. Pato, Costa Mesa, all of Calif.

[73] Assignee: Urethane Technologies, Inc., Orange, Calif.

[21] Appl. No.: 534,730

[22] Filed: Sep. 27, 1995

Related U.S. Application Data

[63] Continuation of Ser. No. 126,316, Sep. 24, 1993, abandoned.

[51] Int. Cl.$^6$ ............................................... C08J 9/32
[52] U.S. Cl. .................... 521/51; 521/54; 521/142; 521/143; 521/145; 521/146; 521/147; 521/148; 521/149; 521/150; 521/155; 264/45.5; 264/DIG. 5
[58] Field of Search ..................... 525/51, 54, 142, 525/143, 145, 146, 147, 148, 149, 150, 155; 264/45.5, DIG. 5

[56] References Cited

U.S. PATENT DOCUMENTS

| | | |
|---|---|---|
| 2,676,892 | 4/1954 | McLaughlin . |
| 2,797,201 | 6/1957 | Veatch et al. . |
| 3,365,315 | 1/1968 | Beck et al. . |
| 3,611,583 | 10/1971 | Anderson et al. . |
| 3,670,091 | 6/1972 | Frantz et al. . |
| 3,699,050 | 10/1972 | Henderson ............................ 252/317 |
| 3,796,777 | 3/1974 | Netting ................................... 264/13 |
| 3,961,978 | 6/1976 | Brodmann . |
| 4,250,136 | 2/1981 | Rex ........................................ 264/257 |
| 4,532,094 | 7/1985 | Wu et al. ............................... 264/53 |
| 4,771,079 | 9/1988 | Melber .................................. 521/54 |
| 4,822,542 | 4/1989 | Kuwabara et al. .................... 264/50 |
| 4,874,796 | 10/1989 | Allen et al. ........................... 521/59 |
| 4,908,930 | 3/1990 | Wycech ................................. 264/46.1 |
| 4,946,737 | 8/1990 | Lindeman et al. ................... 521/54 |
| 4,995,545 | 2/1991 | Wycech ................................. 264/46.6 |
| 5,008,298 | 4/1991 | Allen ..................................... 521/139 |
| 5,110,837 | 5/1992 | Harclerode et al. .................. 521/58 |
| 5,114,640 | 5/1992 | Harclerode et al. .................. 264/53 |
| 5,155,138 | 10/1992 | Lundquist ............................. 521/149 |
| 5,246,973 | 9/1993 | Nakamura et al. ................... 521/54 |
| 5,260,343 | 11/1993 | Harrison et al. ...................... 521/54 |
| 5,272,001 | 12/1993 | Weisman ............................... 521/54 |
| 5,418,257 | 5/1995 | Weisman ............................... 521/54 |

FOREIGN PATENT DOCUMENTS

| | | |
|---|---|---|
| 041077 | 4/1972 | Japan . |
| 041079 | 4/1972 | Japan . |

OTHER PUBLICATIONS

Expancel Nobel Industries, *EXPANCEL® Product Specification*, Feb. 1991, Sundsvall, Sweden.

Robert A. Ruhno and Bruce W. Sands, "Hollow Spheres," *Handbook of Fillers for Plastics*, 1987, Katz & Milewski, Van Nostrand, pp. 437–452.

*Primary Examiner*—James J. Seidleck
*Assistant Examiner*—John M. Cooney, Jr.
*Attorney, Agent, or Firm*—Oppenheimer Poms Smith

[57] ABSTRACT

Shaped microcellular structures having substantially non-cellular skins are produced from reactive liquid polymer systems incorporating thermoplastic microspheres containing volatile materials such as low boiling point halogenated or non-halogenated organic materials. Use of thermoplastic microspheres encapsulating such volatile materials facilitates the removal of the shaped foamed structure from molds, eliminating the need for release agents. Various products based on this process, such as bathroom fixtures, bicycle and wheel chair tires, shoe soles, and automotive parts, are provided.

24 Claims, No Drawings

PROCESS FOR FORMING MICROCELLULAR STRUCTURES HAVING AN INTEGRAL SKIN AND PRODUCTS THEREOF

This application is a continuation of Ser. No. 08/126,316 filed on Sep. 24, 1993, which is now abandoned.

BACKGROUND OF THE INVENTION

1. Field of the Invention

This invention relates to a process for producing foam structures having an integral, substantially non-cellular outer covering and a lower density microcellular core and to the foam structures thereby obtained. More particularly, the present invention relates to the use of expandable microspheres which simultaneously function as a blowing agent and a release agent in liquid polymeric systems used to produce shaped foam articles.

2. Description of Related Art

The manufacture of articles using liquid polymeric systems is well known in the art and has had commercial applications for a number of years. Within this field, the use of techniques designed to produce foamed or cellular polymeric materials has played an increasingly important role. By altering the manufacturing conditions and polymeric system components, objects made from thermoplastic or thermoset cellular materials may be formed to exhibit a wide variety of advantageous characteristics. For example, depending on the processing parameters selected, the resultant article may be rigid and relatively inflexible or soft and pliable. However, in either case the density of the object is less than a corresponding article constructed from the same nonfoamed material. As such, cellular constructs tend to use less polymeric matrix material with a corresponding reduction in weight and, in addition, may display desirable characteristics with respect to thermal conductivity and impact absorption.

Originally rubber was the primary material used to manufacture cellular structures. Today foamable compositions may be manufactured using numerous thermoplastic materials and thermoset resins as polymer substrates. A variety of materials may be used for the fabrication of foamed structures depending on the desired properties of the finished article. Some of the more widely used materials are polyurethanes, polyvinyl chloride, polyolefins and polystyrene. Thermosetting materials useful in the production of various foamed compositions include polyisocyanurates, polyurethaneureas, polyureas, polyesters, and acrylics, phenolics, urea-formaldehyde resins and epoxy resins. This diversity allows highly specific materials with appropriate characteristics to be fabricated.

In general the production of cellular materials involves three basic steps. First, small discontinuities or cells are created in the desired polymer matrix while it is in a fluid or plastic phase. Numerous agents may be employed for generating these cells. Next, using any one of several techniques, the volume of these cells are expanded to produce a polymer matrix having the desired density. Finally, the matrix material is stabilized through the use of physical or chemical means, producing a lower density article which may be modified to exhibit various attributes depending on its proposed function.

Various approaches for the production of cellular or foamed polymeric materials have been developed over the years, leading to compositions with unique structural properties. In general, the resulting product may be classified based on the process selected for foaming the polymer. Traditionally, blown cellular materials have been formed by the inclusion of a volatile blowing agent in the polymeric matrix before molding. During processing, the incorporated blowing agent expands to form cells within the matrix, which is then fixed by chemical or physical means. A variation of this process used in the production of structural foams, combines the use of a blowing agent with a modified molding or extrusion process. Structural foams may be distinguished from simple blown material in that the structural foam possesses a dense, integral skin which is formed on the surfaces adjacent to the face of the mold. A last major class of cellular materials, termed syntactic foams, are produced through the encapsulation of hollow organic or inorganic microspheres within the polymeric matrix.

The oldest processes for producing non-syntactic foams used air as a blowing agent and mechanically incorporated it into the matrix material. While numerous blowing agents have been employed in foaming processes through the years, they usually fall into one of two categories depending on their physical state when added to the liquid polymeric system. Physical blowing agents comprise volatile liquids and compressed gases that are generally added to the polymeric melt or liquid system and later forced into a low pressure gas phase by adjusting the system parameters. In contrast to the liquid and gas phase physical blowing agents, chemical blowing agents are commonly added as solid compounds and decompose at processing temperatures to generate a gas. Various nitrogen-containing chemical blowing agents with specifically engineered decomposition temperatures are commercially available and designed for use in different polymeric systems.

For uniform cellular formation, the chemical or physical blowing agent is evenly dispersed throughout the fluid polymer melt or liquid system to create a suspension. When a physical blowing agent is employed in a polymer melt process this melt is often maintained under pressure to ensure the polymer solution is supersaturated with the blowing agent. The enriched melt is then subjected to an increase in temperature or a slight decrease in pressure which forces the blowing agent to undergo a phase change and diffuse from the polymer matrix. The diffusion and accretion of the blowing agent at discrete points in the liquid polymer melt results in cellular nucleation. When a solid chemical blowing agent is employed, individual cellular nucleation sites are produced at discrete points by generating a gas on the surface of the agent during thermal decomposition. For both types of blowing agents, cellular formation and the resulting structural composition of the foamed article may be adjusted through the regulation of reaction and/or processing parameters.

Depending on the choice of blowing agent, there are several mechanisms which may be employed during the production process to generate gas and provoke cell nucleation. One of the most common methods uses the exothermic heat generated by polymerization to volatilize a low-boiling liquid injected into the polymer components. In other models the gas is actually generated as a byproduct of chemical condensation reactions involving the crosslinking of the polymer matrix. Still other thermoplastic molding processes rely on a gas injected directly into the polymer melt and expanded simply by releasing the pressure on the system. Often these different mechanisms of cell nucleation are combined to lower the unit cost and increase the efficiency of the cellular reactions.

By modifying traditional production processes, structural foam having a non-cellular skin may be produced instead of simply blown cellular material. Such foams are characterized by an integral skin surrounding a cellular core and a high strength-to-weight ratio. These structural foams are typically manufactured using injection molding, extrusion or casting, depending on the product requirements and type of polymer used. In general it is believed that the foaming polymer system builds pressure in the mold or die and the blowing agent, which is in that layer of foam which is adjacent to the cooler mold surface, condenses causing cell collapse which results in skin formation.

The most widely used processes for manufacturing structural foams involve variations of injection molding techniques. In the low pressure process, a shot of resin or thermoplastic material containing a blowing agent is forced into the mold where the expandable mixture fills the mold cavity at pressures of 100 to 600 psi. Cellular collapse on the surface of the mold produces articles with an integral skin and cellular foam core. The high pressure process is similar except the polymeric melt and blowing agent are injected into an expandable mold. As the mold cavity expands a structural foam is produced with a highly uniform surface since the skin was formed before the expansion occurred.

One of the more dynamic areas of structural foam production involves the use of liquid polyurethane systems in reaction injection molding. This process is more efficient in producing large area, thin wall and load bearing structural foam parts. In reaction injection molding (RIM), liquid components such as polyol and isocyanate components are metered into a temperature controlled mold which is partially filled. The amount the mold is filled depends on the desired density of the finished polyurethane foamed article but typically ranges from about 20% to 60%. As the reaction mixture expands to fill the cavity, it forms a component part with an integral, solid skin and a microcellular core.

Structural foam parts may also be manufactured by using conventional liquid polymeric extruders having a specially designed die. A hollow extrudate is produced by using a die with an inner, fixed torpedo located at the center of its opening. As the outer layer of the extrudate cools it forms a solid integral skin. Following the formation of this skin, the remaining extrudate expands inward toward the center of the defined opening. The Celuka process, widely used for the commercial extrusion of foamed products, is representative of this technique.

Due to several unique and beneficial characteristics, one of the most common families of blowing agents employed in the large scale production of structural foamed material are chlorofluorocarbons (CFC's). Chlorofluorocarbon liquids become gaseous at well-defined temperatures and controllable rates, producing structural foam products with a better surface, more uniform cell structure, and overall high product yield. Furthermore CFC's leave no residue to complicate post production operations. However, due to environmental considerations (ozone depletion), the production of many CFC's, including trichloromethane or CFC 11, is to be terminated over the next few years. While other CFC's with lower ozone depleting properties are being developed, most under consideration still have adverse effects on the environment and their use will likely be restrained in the future.

In addition to CFC's, other physical blowing agents have been employed to produce structural foam products. For instance, methylene chloride is also used to produce integral skin urethane foams, but it usually yields softer products with inferior properties. Moreover, methylene chloride is quite toxic and a known animal carcinogen. Accordingly, its use is increasingly restricted by state and federal regulatory agencies. Water has also been used as a blowing agent to make polyurethane foam since it reacts with polyisocyanates and liberates $CO_2$, which acts as a cell generator. However, due to the non-condensable nature of $CO_2$ gas, the integral skin produced is rough and generally inferior to that produced by other methods. Limited success with water blown systems has been achieved using high G forces generated by centrifugal casting, but this technique has proved unsuitable for a wide variety of products.

In contrast, the production of structural foams using non-halogenated, low boiling point hydrocarbons as blowing agents has proven to be relatively efficient. Like CFC's these hydrocarbons possess well defined phase changes and steady, controllable vaporization rates. Furthermore such hydrocarbons leave no residue and produce structural foam having a substantially uniform cell structure and smooth integral surface.

Yet, due to their volatile nature, the use of such hydrocarbons in their liquid state poses several problems related to the handling of the material as well as ensuring its uniform dissolution within the polymeric melt. In most instances the volatile hydrocarbon must be injected or mixed with the melt under high pressures to ensure that the blowing agent will not come out of solution prematurely and interfere with the shaping process. Accordingly, the use of low boiling point hydrocarbons to produce structural foam generally requires the use of complicated and expensive production apparatus designed to maintain the entire liquid polymeric system under relatively extreme conditions until the melt is allowed to assume its final configuration.

While several techniques have been developed to ameliorate these processing and storage complications, none has proved to be entirely satisfactory. Methods developed for evenly distributing volatile liquid blowing agents in polymeric systems and storing the activated melt still require that the unexpanded compositions be kept under pressure. This leads to elevated costs due to increased equipment and energy expenditures.

For instance Wu et al., U.S. Pat. No. 4,532,094 and Kuwabara et al., U.S. Pat. No. 4,822,542 describe methods for forming cellular molded structures using particles of thermoplastic resin imbibed with volatile blowing agents. The solvent imbibed polymer particulate may be used to mold a structural foam article using a low pressure injection molding procedure. Yet, after formation the solvent imbibed particles are subject to decomposition and must be maintained under special conditions to prevent the premature vaporization of the blowing agent.

Similarly, Allen et al., U.S. Pat. No. 4,874,796 and U.S. Pat. No. 5,008,298 describe a process for producing expandable vinyl aromatic (styrene) resin beads containing a volatile blowing agent. The actual impregnation of the beads is performed in a complex aqueous solution using elevated temperatures and pressures. While the solvent imbibed styrene does react to form acceptable foam products, there is no indication that the process is capable of producing structural foam having an integral skin. Further, the specificity of the reaction solution and conditions would interfere with the use of different polymeric systems. Coupled with the complexity inherent in the solvent introduction, any such protocol would make any large scale manufacturing unwieldy and expensive.

Given the drawbacks connected with the use of volatile blowing agents in manufacturing and the limitations associated with solid chemical blowing agents, the need for different techniques to form cellular materials becomes apparent. One such method involves the use of organic or inorganic microspheres distributed throughout the polymer matrix to produce a syntactic foam. As with traditional blown foams, syntactic foams may be made using thermoplastic materials or thermoset resins. The hollow microspheres may be fixed or expandable and are usually added to the liquefied polymer matrix by simple mixing at atmospheric pressures. When using expandable microspheres, foamed objects may be produced using various forms of liquid injection molding, compression molding, reactive extrusion or casting.

Hollow microspheres have been available for over thirty years and extensively used as a filler in polymer applications. These microspheres may be constructed from inorganic materials such as glass or ceramics, or organic materials such as carbon or polyvinylidene chloride. The use of these microspheres in various resin systems to reduce density is well documented and includes their incorporation in inks, paper, various fabric applications, PVC plastisols, putties, rubbers, silicones, polyurethanes and even explosives. Inorganic microspheres tend to have rigid shells and usually maintain a constant volume during manufacturing applications. In contrast, certain classes of organic microspheres may be constructed from pliant materials and fluctuate in volume during use.

Termed expandable microspheres, these organic microspheres are usually constructed from a thermoplastic material and typically enclose a volatile gas or liquid. When subjected to heat these microspheres are capable of swelling to several times their original volume. Quite often these organic spheres are expanded prior to being mixed with a liquid polymer system thereby acting as a traditional filler. In other instances they are mixed with a polymer in their unexpanded state and swell during processing. In either case the resultant foamed products tend to exhibit a rough, pitted surface which often requires post production finishing.

A standard use for microspheres as a simple filler was described by Rex in U.S. Pat. No. 4,250,136 which discloses a method for forming a composite structure using a foam core containing a high volume of microspheres. The core matrix is thermosetting resin and is molded with the outer layer of composite material under heat and pressure. Organic or inorganic hollow spheres of 10–15 µm, uniformly distributed throughout the uncured resin matrix, reportedly aid in weight reduction and impact absorption thereby protecting delicate instrumentation.

In another embodiment, a thermoset resin containing expandable microspheres used to reinforce a structural member was proposed by Wycech in U.S. Pat. No. 4,995,545. The unexpanded microspheres are activated by the heat generated in the exothermic polymerization reaction. With an original diameter of approximately 5–7 µm, the spheres are reported to swell to a diameter of approximately 40 µm during the polymerization reaction. This resin containing the expanded microspheres was allowed to cure in a cavity and thereby reinforce the structure. According to the teachings of the reference, the microsphere filled resin was tightly bound to the structural member.

In general, whether the cellular material is produced using hollow microspheres or volatile blowing agents, most reactive polymer systems in use today tend to adhere to equipment used to shape the foamed article. Many manufacturing protocols for cellular products require that external release agents be periodically applied to the mold to permit part removal. This is a time consuming and labor intensive step which can greatly slow the pace of production. In addition, periodic tool stripping or cleaning is often required due to the continual build-up of polymer on the mold. Additionally, the residue left on the molded cellular part must be washed off the surface prior to painting or other post-finishing operation in order to obtain good adhesion.

In the case of some selected polymeric systems, compounds exist which may increase the period between release agent applications. For instance it has been reported that the use of zinc stearate (Dow Chemical), in combination with polyether polyamines, can reduce the number of external release agent applications used for reaction injection molding (RIM) processes with polyurethanes. This technology is very specific and no single compound is broadly applicable for a spectrum of polymer casting systems. For example zinc stearate is not effective for non-amine containing polyurethane materials, e.g. those containing only polyhydroxy reactive components. Thus, while the zinc stearate may be used to reduce the number of applications of external wax or soap release agent required for selected urethane systems, a great number of other polymer systems must have an external mold release applied between every operation. Further, even when zinc stearate is available a separate release agent must be reapplied every 20–30 moldings depending on the complexity of the part.

Accordingly it is an object of the present invention to provide an improved, cost efficient process for the production of structural foam articles.

In particular it is an object of the present invention to provide an improved, cost efficient process for the production of molded articles made of cellular polyurethanes with an integral, substantially non-cellular skin.

Further, it is an object of the present invention to provide a process for manufacturing structural foam without the use of ozone-depleting chlorofluorocarbons.

Additionally it is an object of the present invention to provide a process for the production of molded polymeric foam articles without the need for continuous application of an external mold release.

SUMMARY OF THE INVENTION

The present invention provides a process for the production of structural foam articles which overcomes many of the difficulties inherent in previously disclosed techniques. More specifically the invention comprises adding expandable thermoplastic hollow microspheres containing a volatile material to reactive liquid polymer-forming systems used to produce shaped foam articles. Surprisingly it was found that, under carefully controlled thermodynamic conditions, the reactive liquid polymer-forming system containing such microspheres would produce a structural foam part upon shaping and curing. The resultant part has a substantially non-cellular, integral skin surrounding a lower density microcellular core. By using these expandable microspheres, many of the difficulties associated with introducing and processing volatile blowing agents are eliminated. Further, the process used in the instant invention causes the microsphere material to interact with the mold or die surface, essentially becoming a releasing agent which greatly facilitates part removal and any post-molding operation.

In general the cellular structures of the present invention are fabricated by:

providing a suspension comprising a plurality of thermoplastic microspheres encapsulating a volatile material in a reactive polymer-forming system; and polymerizing said reactive polymer-forming system in which said thermoplastic microspheres are suspended.

More specifically the steps of the process comprise: providing a reactive thermoplastic or thermosetting resin-forming system in liquid form, mixing thermoplastic microspheres containing volatile material which may be a non-halogenated low boiling point hydrocarbon, with the reactive liquid polymer-forming system to establish a uniform suspension, polymerizing the reactive liquid polymer-forming system containing the microspheres, and molding, casting or extruding the product of polymerization under carefully controlled thermodynamic conditions.

The microspheres are compatible with liquid polymeric processing equipment and eliminate the need for an external mold release. As a result the instant invention improves the surface quality of the finished product, facilitates the molding process itself and simplifies post-molding operations.

Further objects, features, and advantages of the present invention will become apparent to those skilled in the art from a consideration of the following detailed description.

DETAILED DESCRIPTION OF EXEMPLARY EMBODIMENTS

The present invention involves the production of microcellular structures having an integral skin using a highly efficient, environmentally sound technique without the repeated application of external release agents. More specifically the invention relates to the surprising discovery that organic microspheres containing a volatile material such as a non-halogenated, low boiling point hydrocarbon may be used as both a blowing and release agent. By altering the reaction conditions, the density of the microcellular core and thickness of the integral skin may be favorably adjusted to reflect the intended use of the part. Further, the process disclosed herein advantageously incorporates commercially available materials and existing equipment to overcome the disadvantages in the prior art in a cost efficient manner.

In addition to being advantageously compatible with all standard liquid polymer processing equipment the instant invention does not require extreme conditions to ensure the efficient operation of the blowing and release agent. The use of organic microspheres in liquid reactive systems is compatible with both low pressure mechanical and static mixing equipment as well as high pressure impingement mixing units. Furthermore, the invention is congruous with most major ,shaping techniques presently used in the production of cellular structures. For example, molds and dies useful with the systems described herein may be made of the materials most commonly used in manufacturing today.

Depending on the liquid reactive system employed, the microcellular structures of the present invention may be formed using various casting, molding or reactive extrusion processes. In addition to the adaptability of the liquid reactive system, the choice of process is influenced by economic considerations, number and size of finished parts, and any post-finishing operations. Processes such as compression molding, reaction injection molding (RIM) and structural reaction injection molding (SRIM), offer speed of production, multi-part molding and minimal post-finishing. For larger microcellular structures or those which are incompatible with reaction injection molding, reaction extrusion processes may be used. Due to low capital expenditures, casting may be used when production volume is moderate and gross cost is the primary limitation. As those skilled in the art will appreciate numerous variations for each of the aforementioned processes exist and it is contemplated that they may also be used with this invention.

Further it should be appreciated that this compatibility with current production technology and adaptability in the face of manufacturing restrictions are significant features of the present invention. The organic microspheres and reactive liquid systems disclosed herein are entirely compatible with both low pressure, mechanical and static mixing equipment as well as high pressure impingement mixing units. Such equipment is supplied by Impiante OMS, Cannon, Krauss Maffei and others. Furthermore, other piston metering units used for Resin Transfer Molding (RTM) also may be used. Additionally, reactive extruders such as those supplied by Respecta, Werner Pfliederer, Bursdorff and others may be used to mix and dispense the product. More specifically centrifugal casting and low pressure machine casting may be performed with conventional PU equipment and RTM type of metering and mixing equipment. In addition high pressure RIM type pouring and/or injection units are compatible with the present invention. Conversely, the invention may be practiced using hand mixing techniques of the proper components and a simplified mold having the shape of the desired part.

Due to the unexpected release properties inherent in the use of organic microspheres, structures produced using the instant invention do not bind to the shaping surface. Accordingly, the molds or vessels suitable for making these structures may be constructed from a wide variety of materials. Suitable materials include both metals and polymeric compositions used in current manufacturing processes. Such materials comprise, but are not limited to, aluminum, steel, brass, silicone RTV rubbers, polyurethane rubbers and plastics such as epoxy or polyvinyl esters. Furthermore, it will be appreciated by those skilled in the art that several duplicate polymeric molds may be constructed using a metal master mold to lower the unit cost of an item.

In addition to being fully compatible with contemporary manufacturing technology, the present invention may be practiced using a wide variety of liquid reactive systems. Both thermoplastic materials and thermosetting resins may be used to produce microcellular structures having an integral skin according to the disclosed process. Exemplary liquid reactive systems useful with the instant invention include, but are not limited to, polyurethanes, polyisocyanurates, polyurethaneureas, polyureas, epoxies, silicones, polyesters, polyvinyl esters, polycaprolactam, phenolics, polycyclopentadiene, polyacrylates, polymethacrylates, and acrylics. Similarly hybrid systems including, but not limited to, polyurethane/epoxies, polyurethane polyesters and polyurethane acrylics may be used in the invention. Those skilled in the art will appreciate that many of these systems are commercially available in several different forms or compositions. It is also contemplated that the liquid reactive systems may be used singly or in concert to produce the desired microcellular structure. Further, additives such as flame retardants, antioxidants, inorganic fillers, inorganic or organic reinforcing materials, and thixotropic agents are compatible with the present invention and may be incorporated into the reactive polymeric system.

In an exemplary embodiment of the invention, the reactive liquid system contains a urethane group in combination with other reactive moieties. More specifically this embodiment includes microcellular structures formed using polyurethanes, polyisocyanurates, polyurea-urethanes and polyureas. Conventional mixing processes combined with the teachings of the present invention may be used to produce a foamed structure having the desired release qualities and integral skin. For instance, standard one-shot blending processes may be modified by the addition of organic microspheres and altered thermodynamic parameters to create the desired product. In addition, conventional semiprepolymer, and full prepolymer systems may be modified to correspond to the teachings of the present invention. Such processes may be based on commercially available polyhydroxy or polyamine polyols, hydroxy and/or amino functional chain extenders, aromatic, aliphatic or cycloaliphatic polyisocyanates. In addition it will be appreciated by those skilled in the art that other additives such as catalysts, colorants or fillers may be combined to impart selected properties to the foamed structure.

In another exemplary embodiment, epoxy resins are employed with hydrocarbon-filled microspheres to produce the desired foamed article. Commercially available liquid systems based on bisphenol A and epichlorohydrin may be incorporated according to the teachings of the present invention. These components are blended with conventional hardeners such as amides, anhydrides, aliphatic amines or aromatic amines to yield a foamed structure having an integral skin. Aliphatic epoxies such as polyglycidyl ethers of diols such as a 1,4-butanediol can also be used as can the phenol and cresol novolac types. Aromatic amine and aromatic amino hydroxy based epoxies are also suitable for use with the instant invention. As with the polyurethanes, those skilled in the art will appreciate that conventional fillers, fibers and additives may be used to enhance specific properties.

Still another exemplary embodiment of the present invention involves the use of unsaturated polyester resins for the liquid reactive system. These resin systems may comprise a wide variety of aliphatic and aromatic saturated and unsaturated acids esterified with typical aliphatic glycols. Such glycols include, but are not limited to ethylene, propylene, diethylene, or neopentyl glycols. Further these esters are normally diluted with an unsaturated monomer such as styrene, diallyl phthalate, or a methacrylate, and stabilized with compounds such as hydroquinone or t-butyl catechol. To effect polymerization, organic peroxides such as methylethylketone peroxide or benzoyl peroxide are added to the mixture. In addition, promoters such as cobalt octoate or, in the case of benzoyl peroxide, compounds such as diethyl or dimethyl aniline can be used. Additives suitable for use with this polyester system include, but are not limited to, flame retardants, inorganic fillers, glass, inorganic or organic reinforcing agents, and thixotropic agents.

In addition to the liquid reactive system, microspheres constitute the other principal component of the instant invention. The microspheres used in the invention comprise a thermoplastic shell encapsulating a volatile material such as non-halogenated hydrocarbons, and are preferably inert with respect to the liquid reactive components. In a preferred embodiment the shell material of the microspheres is made of polyvinylidene chloride-acrylonitrile copolymer (PVDC). However, other encapsulating materials such as polypropylene, polyethylene, thermoplastic rubbers, polyamide, polystyrene and acrylonitrile-butadiene-styrene copolymers (ABS) may also impart the desired characteristics to the cellular structure. Essentially any thermoplastic material which is capable of expansion may be used to make microspheres compatible with the teachings of the present invention.

Similarly, a wide range of volatile materials are compatible with the present invention when encapsulated within a polymeric microsphere. While isobutane is the encapsulated hydrocarbon in a number of the disclosed exemplary embodiments, other volatile components such as isopentane or ethanol could just as easily be employed. Moreover, selected high temperature polymer reactions could advantageously use microspheres encapsulating materials which boil at higher temperatures than the low boiling point liquids disclosed in the exemplary embodiments. Advanced volatile organic materials such as non-ozone depleting halogenated hydrocarbons are also contemplated as being within the scope of the invention. More generally, as with the reactive polymeric system, any thermoplastic unexpanded microsphere containing a volatile material and compatible with standard liquid processing equipment may be used as a combined blowing and release agent in the present invention.

A number of commercially available thermoplastic microspheres have an encapsulating layer composed of a copolymer of polyvinylidene chloride and acrylonitrile (PVDC). Several exemplary embodiments of the instant invention use polyvinylidene chloride-acrylonitrile copolymer microspheres from Casco Nobel AB (Sweden) which contain isobutane, a low boiling point hydrocarbon. Such microspheres were described in U.S. Pat. No. 3,611,583 assigned to Dow Chemical and incorporated herein by reference.

By varying the ratio of the polymer components in the thermoplastic shell, the expansion temperature of the PVDC microsphere may be adjusted. Depending on the exact composition of the PVDC shell these microspheres exhibit an initial expansion temperature in the range of 80° C. to 130° C. The microspheres manufactured by Casco Nobel AB are graded and sold according to their thermoplastic shell composition and corresponding initial expansion temperature. Preferred types of unexpanded PVDC microspheres for use in the present invention are sold by Casco Nobel AB under the Trademarks "Expancel 551 DU", "Expancel 091 DU", "Expancel 820 DU", "Expancel 461 DU", and "Expancel 051 DU." These microspheres have an initial diameter of approximately 5–10 µm and, when heated, expand to a diameter of approximately 40 µm. Other equivalent expandable microspheres which are suitable for use in the present invention will be recognized by those skilled in the art. Further, microspheres having a substantially higher expansion temperature than PVDC microspheres may be used with the appropriate liquid polymeric systems.

In addition to the variety of encapsulating materials compatible with the invention, the amount and type of microsphere incorporated may also be varied. Mixtures of different types of microspheres may be used to impart the desired expansion and blowing characteristics. Depending on the desired density of the foamed structure and the parameters used for a particular polymeric system, the microspheres may comprise from 0.05% to 25% of the final overall polymer weight. The uniform dispersal of microspheres at such concentrations provides enough material to unexpectedly act as a release agent on the surface of the shaping apparatus while simultaneously acting as a blowing agent and generating the interior cellular structure. These broader microsphere concentrations are in accordance with the teachings of the present invention and useful for many applications though operative microsphere concentration ranges may be narrower for selected polymeric systems. More specifically, embodiments of the invention often have microsphere concentrations ranging from 0.1% to 10% of the total polymer weight. Microsphere concentrations within such ranges ensure that beneficial microcellular densities will be imparted to almost any polymeric system and resulting structure.

In exemplary embodiments of the instant invention, the microspheres are essentially inert and may be blended with any or all of the components of the liquid reactive system. For instance in polyurethane systems, they may be blended with either the polyol or the isocyanate or chain extender, or any combination of the three. Further the microspheres may be distributed among the reactive liquid components in any manner conducive to the formation of the cellular structure and manufacturing constraints.

Unexpanded microspheres having a diameter on the order of 5–15 μm are suitable for the present invention, due to their relatively high density and subsequent ease of processing through the liquid metering, mixing and dispensing equipment commonly used in cellular structure manufacturing. Assuming that the system is subjected to the proper thermodynamic conditions, microspheres of this size will generally result in integral skin formation and the presence of a lower density microcellular core. While not limiting the invention to any one mechanism, it is believed that the interaction of the microsphere encapsulating material with the relatively cool face of the shaping surface imparts non-wetting characteristics to the liquid reactive system. Further, when combined with the enclosed low boiling point hydrocarbon, this encapsulating material is also believed to contribute to the smooth, substantially non-cellular skin found on surfaces in contact with the shaping member. Though naturally smooth, it is of course recognized that the exterior surface of the non-cellular skin may be selectively textured by using a shaping member exhibiting the appropriate features.

In order to facilitate the efficient expansion of the microspheres and promote the formation of the desired skin, the initial reaction conditions of the system may be adjusted. As the exothermic polymerization reaction progresses within the liquid system, it generates heat which is transferred to any unexpanded microspheres causing them to swell. This expansion appears to result from the concurrent softening of the thermoplastic microsphere shell along with the increased vapor pressure exerted by the volatile encapsulant when heated. Accordingly, it is preferable that the expansion initiation temperature of the hydrocarbon filled microspheres be greater than the temperature of the liquid reactive system when polymerization is initiated. Such initial conditions allow for the optimal expansion of the microspheres and promote the uniformity of the resultant structure.

More particularly it is believed that the exothermically driven expansion, coupled with an even dispersion of the microspheres, increases the chances that the encapsulating material and the enclosed volatile hydrocarbons will come in contact with the mold surface. Under the correct thermodynamic conditions, the contact of the microsphere components will promote a sharply delineated integral skin as well as a uniform cellular core. In addition to forming a non-cellular skin, the expansion of the liquid reactive system facilitates microsphere contact with the shaping surface rendering the reactive polymer system non-wetting. It appears that the thermoplastic material of the microsphere shell may act at the shaping surface to reduce the adhesion of the reactive polymer system. This advantageous aspect of the invention appears to occur with all types of mold surfaces and facilitates part removal as well as any post-molding coating or bonding operation.

As previously indicated, select PVDC microspheres containing volatile hydrocarbons exhibit a discrete initial expansion temperature in the range of 80° C. to 130° C. as measured by thermomechanical analysis (TMA). In most embodiments of the present invention, the heat generated by the exothermic polymerization of the liquid reaction system will cause the substantial expansion of the suspended microspheres prior to the solidification of the polymeric system. Preferably, at least 20% of the potential microsphere expansion will be completed before the swelling and microcellular enlargement is halted by the increasing viscosity of the liquid reactive system. More preferably 40% of the potential cellular expansion is completed and even more preferably 80%. In highly crosslinked, hard systems generating more heat, this degree of microcellular enlargement may require the use of microspheres which expand at lower temperatures. Conversely, with substantially linear, softer systems where relatively less heat is generated before solidification but the system is processed at a higher temperature, it is preferred that thermoplastic microspheres having a higher initial expansion temperature be employed. Those skilled in the art will realize that cellular expansion profiles may be attenuated using combinations of microspheres having different expansion characteristics.

In addition to the dynamic system components, the degree of microcellular expansion, the formation of sharply delineated integral skin and corresponding part release properties are influenced by the temperature of shaping surface. For instance if the shaping surface is too cold it may act as a heat sink, conducting the exothermic heat away from the reacting polymer. This can result in under utilization of the microspheres and subsequent high density moldings with very thick skins and inferior release properties. Conversely, if the surface is too hot, the microcellular expansion may be too extensive, producing inconsistent skin formation and inferior release characteristics. Therefore, in exemplary embodiments of the invention the surface temperature of the mold, vessel or extrusion die is kept at between 40% and 90% of the expansion initiation temperature of the thermoplastic microspheres suspended in the liquid reactive system as measured by TMA. More preferably, the surface temperature of the shaping structure is kept between 60% and 80% of this value as measured by TMA. These ranges may be broadened by using a mixture of unexpanded microspheres. The use of such ratios ensure the even formation of an integral skin along with the uniform dispersal of encapsulation material on the shaping surface to facilitate part removal.

Thermomechanical analysis of exemplary embodiments of the invention using microspheres produced by Casco Nobel AB provide support for these empirically derived values. For example, using the thermoplastic microsphere termed Expancel 551 DU, having a reported expansion initiation temperature of approximately 99° C., the shaping surface temperature is preferably between 40° C. and 90° C. or between 40% and 90% of the expansion initiation value. More preferably the shaping surface temperature is kept between 60% and 80% of this value, or 60° C. to 80° C. In another example using the microsphere termed Expancel 091 DU, with a reported expansion initiation temperature of approximately 128° C., shaping surface temperatures should be between 51° C. and 115° C. and more preferably between 77° C. and 102° C. Similarly, the microsphere termed Expancel820 DU, with a reported expansion initiation temperature of approximately 82° C., preferably has shaping surface temperatures between 33° C. and 74° C. and more preferably between 49° C. and 66° C. While these temperature ratios have been determined with PVDC copolymer based encapsulants, it is contemplated that other encapsulants will exhibit corresponding values due to the similarity of the physical reactions involved. As such the reported ratios should not be limited solely to PVDC copolymer microspheres.

As previously indicated other techniques may be used to attenuate the reaction conditions so as to produce a structure with the desired properties. For example, mixtures of microspheres may be used in the invention to advantageously broaden the range of mold temperatures and alter the density and subsequent hardness of the molded article. Accordingly, if a particular polymeric system requires a cooler mold for optimum processing but the reaction profile results in very rapid expansion of the selected 820 DU spheres and poor processing, then a portion of these spheres may be replaced by the higher temperature expanding 551 DU spheres. Such substitutions can produce the desired expansion and density without compromising the release properties and skin definition of the finished structure even though the mold temperature may be below the optimum range for the 551 DU microspheres. Conversely, if a particular reaction profile of a polymer system requires a high mold temperature for curing purposes but the exotherm temperature of this polymer system is not sufficient to cause the 551 DU microspheres to expand properly, then a portion of the 551 DU microspheres may be replaced with 820 DU microspheres to accomplish adequate blowing. While the mold temperature is higher than the optimal temperature for the 820 DU microspheres, parts may be made with excellent releasing properties and a clearly defined skin. Similar mixtures are not limited to PVDC microspheres and may include combinations of microspheres having different surface materials or encapsulating different volatiles.

Other objects, features, and advantages of the present invention will become apparent from the exemplary embodiments which follow:

EXAMPLE 1

A polyol mixture suitable to make a polyurethane elastomer was prepared from a 4500 molecular weight polyoxypropylene triol containing a 20% by weight polyoxyethylene capping, 80 parts; 1,4 Butanediol, 20 parts; dibutyltindilaurate catalyst, 0.01 parts and black pigment 0.5 parts. 5.0 parts of Expancel 551 DU microspheres were added. After thoroughly mixing these components, 91 parts were added of a quasi prepolymer based on diphenylmethane diisocyanate and a mixture of dipropylene and tripropylene glycols, NCO content 23.1%. This blend, at 30° C., was thoroughly mixed and degassed, then 150 gm were poured into a 500 ml, dry polypropylene beaker. The following reaction times were noted: initial foaming (cream time) 1 min. 30 sec., rise and tack-free time 3 mins. The free rise density of this light gray, ultra fine celled material was 0.52 gm/ml.

Following the preliminary determination of reaction characteristics, a clean and dry (no mold release) aluminum mold with a 152.4 mm×152.4 mm×25.4 mm (6"×6"×1") cavity (589 ml), was preconditioned at a temperature of 80° C. Based on the free-rise density of 0.52 gm/ml, the calculated specific gravity of the polymer at 1.12 gm/ml it was calculated that c.a. 400 grams of liquid polymer mix would be required to assure complete filling of the mold by overcharging it 10%. The experimental formulation was repeated, increasing the batch size to 400 grams and poured into the mold which had been placed in the vertical position. The mold was closed and tilted in such as way as to assure that the liquid mixture would come into contact with all the mold cavity surfaces prior to foaming and then placed in a 80° C. oven for 6 minutes. The mold was then removed from the oven and opened and the part was easily removed. The overall density of the molded part was 0.66 gm/ml. The molded part was then cut in half revealing a black, highly compact, bubble-free skin of 0.9 to 1.2 mm in thickness sharply delineated from a light gray core similar in appearance to the free-rise material. The hardness of the exterior of the molded part was 90–93 as measured by Shore A durometer and the core material was Shore A 67–70. The skin was cut off and the core density was found to be 0.57 gm/ml.

EXAMPLE 2

Example 1 was repeated except the mold temperature was increased to approximately 100° C. After 6 minutes the mold was opened with extreme difficulty and the part forcibly removed damaging it in the process. Upon visual observation to the sample, there was virtually no skin on the exterior of the part and the quality of the surface was very poor.

EXAMPLE 3

Example 1 was repeated except the mold temperature was reduced to 50° C. After 6 minutes the mold was opened with extreme difficulty and the part forcibly removed. Upon examination, the polymer had not totally filled the mold and had a very poor surface quality skin of approximately 6 mm. The overall density of the part was 0.88 gm/ml.

EXAMPLE 4

Example 1 was repeated except Expancel 091 DU was used in place of Expancel 551 DU. After 6 minutes the mold was opened with extreme difficulty and the part forcibly removed. Upon examination, the polymer had not totally filled the mold and had a very poor surface quality skin of approximately 4–5 mm. The overall density of the part was 0.85 gm/ml.

EXAMPLE 5

Example 1 was repeated except Expancel 091 DU was used in place of the Expancel 551 DU and the mold temperature was increased to 95° C. The molding so obtained was remarkably similar in appearance and processing to that obtained in Example 1. The sample had an overall density of 0.50 gm/ml and a skin hardness of 93–95 Shore A and a core hardness of 73–76 Shore A.

EXAMPLE 6

Example 1 was repeated except Expancel 820 DU was used in place of Expancel 551 DU. Due to the low expansion temperature of the 820 DU material, the mold temperature was lowered to 55° C. The molding so obtained was very similar in appearance and processing to that obtained in Example 1. The overall specific gravity of the sample molding was 0.50 gm/ml and a skin hardness of 93–95 Shore A and a core hardness of 72–75 Shore A.

EXAMPLE 7

Example 6 was repeated using a mold temperature of 30° C. After 6 minutes, the mold was opened with great difficulty and the part forcibly removed. The surface quality of the 4–6 mm skin was very poor. The polymer had not totally filled the mold cavity and the overall specific gravity 0.90 gm/ml.

EXAMPLE 8

Example 6 was repeated using a mold temperature of 75° C. After 6 minutes, the mold was opened with difficulty and the part was forcibly removed. The skin was virtually non-existent and the surface quality very poor.

EXAMPLE 9

Example 1 was repeated except 0.20 parts of water and 0.25 parts of L5340 silicone surfactant were added to the polyol mixture while the Expancel 551 DU microspheres were not added. The amount of the isocyanate quasi prepolymer was increased by 4.0 parts. An identical mixing and molding process was used. The free-rise foam had a density of 0.46 gm/ml and the cell structure was rather coarse. The molded sample, which had to be forcibly removed from the mold with extreme difficulty, had a density of 0.55 gm/ml and had a medium to light gray overall appearance and a Shore A hardness of 67–70. After the part was cut in half, a slightly compacted but clearly cellular skin was observed, which gradually decreased in density from surface to core over a distance of 0.51 mm. The core resembled the free-rise foam and had a similar density of 0.50 gm/ml.

EXAMPLE 10

100 parts (0.067 equivalents) of a 3000 molecular weight polyoxypropylene diol containing 30% by weight of polyoxyethylene capping was charged into a mixing vessel. 0.008 parts of potassium acetate were then thoroughly mixed with the polyol. 3.0 parts of Expancel 551 DU were then mixed into the polyol/catalyst mixture. To this mixture was added 100 parts (0.551 equivalents) of the MDI quasi prepolymer described in Example 1. The free-rise foaming process described in Example 1 was repeated, using a 30° C. mix temperature for the components, and similar reactivities were observed except that the rise and tack-free time was reduced to 2 minutes. The light amber, free rise foam had a density of 0.47 gm/ml. The molded part could be easily removed in 4 minutes. The polyisocyanurate/urethane copolymer molding had an overall density of 0.62 gm/ml and a Shore D of 70. When cut in two, an amber, virtually transparent, non-cellular skin of 0.7–0.8 mm in thickness was observed on all surfaces which had been in contact with the mold. This skin was sharply delineated from the off-white core material. Due to the fineness of the expanded microspheres, the core material appeared to be virtually solid but had a density of 0.52 gm/ml. and a Shore D hardness of 50.

EXAMPLE 11

The polyisocyanurate urethane copolymer of Example 10 was repeated in all respects except the mold temperature and oven temperature were reduced to 40° C. The free rise foam was virtually identical to Example 10 with a density of 0.51 gm/ml. The molded part however had not filled the mold cavity and was fairly difficult to remove from the mold. The molded part had an overall density of 0.85 gm/ml. Upon cutting the molded part in half, a thick, 2–3 mm, virtually transparent skin was observed. The core density was 0.75 gm/ml. The hardness of the skin was Shore D 72–73 and the core was Shore D 56–58.

EXAMPLE 12

Example 10 was repeated in all respects except that the mold and oven temperature were raised to 110° C. As in Example 10 the free rise foam had the same reactivity and density. However the molded part was very difficult to remove from the mold. The density of the light amber molded part was 0.52 gm/ml. Upon cutting the part in half, there was observed virtually no skin present and the core had many visible cell imperfections.

EXAMPLE 13

69.0 parts of a 1000 molecular weight polytetramethylene ether diol were mixed with 25 parts of a 4500 molecular weight polyoxypropylene ether triol capped with 18% ethylene oxide. 6 parts of 1,4 Butanediol were added to the mixture as were 5 parts of Expancel 551 DU and 0.015 of dibutyltindilaurate. The mixture was thoroughly agitated at 25° C. until homogeneous. To this mixture was added 41 parts of a uretonimine modified diphenylmethane diisocyanate, 29.3% NCO. After thorough mixing for 30 seconds, the material was poured into a open container and allowed to react in a free rise condition. The reaction initiation was noted in 1 minute and 15 seconds and final rise and tack-free time was 3 minutes and 45 seconds. After 10 minutes, the material density was measured to be 0.55 gm/ml.

A second mix was prepared of a larger size and the molding procedure of Example 1 was repeated. After 6 minutes, the mold was easily opened and the part removed. The compact skin was approximately 1–2 mm thick and had a hardness of 70–75 Shore A. The core had a density of 0.45 gm/ml and a hardness of 40 Shore A. The overall density of the molding was 0.55 gm/ml. The molding was again repeated except a clean and dry aluminum mold was used which had a cavity designed for a shoe sole. After 6 minutes, the mold was easily opened and the part was effortlessly removed. The overall density was similar to the test block described above as was the skin thickness and quality. A shoe sole of this density with a long wearing skin is appropriate for durable cushioned outsole material.

EXAMPLE 14

100 gm of a glycidyl ether type epoxy resin (Epon 828) was charged into a mixing beaker. 8 gm of Expancel 551 DU were added and thoroughly mixed. To this mixture, at 25° C. was added 100 gm of a polyamide hardener (50 percent by weight Versamid 115 and 50 percent by weight Versamid 125) also at 25° C. The hardener was thoroughly mixed with the epoxy-Expancel blend until homogeneous. The entire mixture was then put into a clean and dry (no mold release) heavy walled, open top, tin container and placed in an 80° C. oven. Within five minutes, the epoxy resin had hardened and was demolded with ease from the container. The brown, essentially free rise, polymer sample had a density of 0.38 gm/ml and a well defined, essentially non-cellular, darker brown skin of 1–3 mm corresponding to those parts of the polymer adjacent to the bottom and sides of the container.

EXAMPLE 15

100 parts of Dow epoxy resin D.E.R. 331 were charged to a mixing container. 5 parts of Expancel 551 DU were added to the D.E.R. 331 along with 2 parts of a dry fluorescent pigment from United Minerals Co. (FB-503). This mixture was thoroughly agitated and 12.9 parts of Dow D.E.H were added. The mixture was further agitated for 5 minutes and poured into the mold used for Example 1 heated to 60° C. After 30 minutes the mold temperature had risen to 150° C. and the mold was cooled in a water bath for 60 minutes. It was then easily opened and the part removed. The overall density was measured at 0.58 gm/ml and the surface hardness was measured at 83 Shore D. The structure had a core hardness of 40–45 Shore D with a skin thickness approximately 2–3 mm thick.

EXAMPLE 16

100 grams of a general purpose unsaturated polyester resin was mixed with 100 grams of milled E-glass fibers. 10 grams of Expancel 551 DU microspheres were added to this mixture and thoroughly blended. 0.5 grams of methylethylketone peroxide was then added and the entire mixture was further blended for 40 seconds and poured into a 3.9"×6.0"×0.5" (9.91 cm×15.24 cm×1.27 cm) cavity in an aluminum mold which had been preconditioned at 75° C. After 1 minute and 20 seconds, the material had gelled but continued to expand for an additional 1 minute and 40 seconds. After curing at 75° C. for 30 minutes, the mold was opened and the block of cured polyester easily removed. The block had an overall density of 0.92 gm/ml. The material density, without foaming had a theoretical calculated value of 1.52 gm/ml. The molding was then cut in half and a well defined, 3–5 mm skin was observed around the edge of the part. A lighter color core was observed as well. The hardness of the exterior skin was measured as Shore D of 88 and the core material at a Shore D of 55.

EXAMPLE 17

100 parts (1.11 eqs.) of a polyol consisting of a propylene oxide adduct of glycerin, molecular weight 270 was charged to a mixing vessel. 4 parts (0.003 eqs.) of a titanium dioxide pigment dispersion was added to the polyol. 2 parts of a proprietary blend of anti-oxidants and ultra-violet absorbers of the hindered phenolic, benzophenone, and benzotriazole type were also added to the polyol. In addition 2 parts of molecular sieves, 100 parts of finely ground feldspar, 3.5 parts of Expancel 051 DU spheres and 0.03 parts of dibutyltindilaurate were also added to the polyol. The polyol and additives were thoroughly blended at 30°–40° C. 155 parts (1.10 eqs.) of a proprietary prepolymer based on the isocyanate terminated reaction product of low molecular weight propylene oxide based hydroxyl terminated adducts and a blend of aromatic and cycloaliphatic polyisocyanates, at 35° C., was added to the polyol mixture and thoroughly blended. The mixture was allowed to react in a free rise condition and the following reaction profile noted: rise initiation time of 45 seconds, a total rise time of 150 seconds, and a tack-free time of 160 seconds. Within 6 minutes the material appeared to be completely hardened and the density was measured at 0.49 gm/ml.

Another polymer mixture was prepared, this time increasing the total polymer weight to approximately 400 grams. This mixture was introduced into an clean and dry aluminum mold, similar to that used in Example 1, which had been preheated to 70° C. and to which no mold release had been applied. After 3 minutes, the mold was opened and the part was removed easily. After cooling, the part had an exterior surface hardness of 88 Shore D, and an overall density of 0.65 gm/ml. After cutting the part, visual examination revealed little definitive skin due to the extremely white nature of both the core and exterior of the sample. However, Shore D hardness of the core was only 73 D and the core density was measured at 0.51 gm/ml indicating that a non-cellular skin had been formed.

EXAMPLE 18

80 parts of a propyloxated glycerine, OH number 660 was charged to a mixing container. 20 parts of a polyoxypropylene glycerine based triol capped with 17% ethylene oxide was added along with 5 parts of Expancel 551 DU, 2 parts of a green pigment dispersed in a 3000 molecular weight polyoxypropylene triol, and 1.8 parts of an aryl mercurial catalyst (Cocure 30 from Cosan Chemical). The mixture was thoroughly blended at 25° C. and 116 parts of tetramethylene xylene diisocyanate was added. After a further 1 minute of vigorous mixing at1750 RPM using a Conn high shear mixing blade, the material was poured into a container and allowed to react and foam in a free rise condition. Initiation of the reaction started in 2.5 minutes and was complete in 6 minutes. After 10 minutes had elapsed, the density was measured at 0.35 gm/ml.

The batch size was increased to 400 gm. and the material was poured into the mold used in Example 1 which had been preconditioned at 75° C. After 10 minutes the mold was allowed to cool to room temperature and was easily opened and the part removed. The molding was characterized by a dark green 1–2 mm skin and a lighter green lower density core. Skin hardness was 78 Shore D and the core hardness was 65 Shore D. The overall specific gravity was 0.62 gm/ml.

The batch size was increased to 6000 grams and this time the mixture was poured into a fiberglass mold with gel coated cavity configured in the shape of a household sink. The mold had been preheated to 75° C. After 20 minutes the mold was opened easily and the part removed. Specific gravity and hardness of the sink were comparable to the test block molded previously. Sections cut from the sink showed a similar skin composition. This molding was repeated except the green pigment was replaced by a UV stabilized titanium dioxide paste pigment at a level of 4 parts per hundred of the base polyol mixture. The resulting molding had similar properties to the previous green molding. The polymer exhibited less than a Delta E 1.0 (versus unexposed control) by color spectrophotometer after 300 hours in a QUV accelerated weathering machine. These types of products would be highly suitable for use in kitchen and bathroom applications as they are durable, color stable, easily produced and relatively inexpensive.

EXAMPLE 19

The white sink molding in Example 18 was repeated except that 200 parts of 340 mesh (mean particle size 9 micron) anhydrous alumino silicate (feldspar) were added per hundred parts polyol. An additional 10 parts of Expancel 551 DU per hundred parts of polyol were also added. The catalyst was increased to 2.5 parts. The molding was removed easily after 10 minutes and had a Shore D hardness of 90 after 24 hours at room temperature. The overall specific gravity was measured at 0.85 gm/ml versus a calculated density of the non-foamed polymer of 1.47 gm/ml. These types of filled products are cost effective for kitchen and bathroom applications and have the added advantage of increased hardness and scratch resistance.

EXAMPLE 20

The polyol mixture of Example 1 was repeated except 11 grams of Expancel 551 DU was added. 113 grams of a quasi prepolymer prepared from diphenyl methane diisocyanate and a 2000 molecular weight polyethylenebutylene polyester polyol with an 18.6% NCO content was added to the polyol mixture. The reaction characteristics were similar to those in Example 1 and, after 10 minutes, the polymer exhibited a specific gravity of 0.24 gm/ml.

A new 500 gram mix of identical proportions was prepared and poured into a centrifugal casting unit which contained a 90 Shore A elastomeric polyurethane mold. The cavity in this mold was in the shape of a 27×1.25 bicycle tire. This process is outlined in detail in U.S. Pat. No. 4,855,096 and the apparatus described in U.S. Pat. No. 4,943,223 both incorporated herein by reference. The clean and dry mold had been preconditioned at a temperature of 60°–65° C. During the pour process the mold was rotated at 325 RPM. The liquid mix was poured onto a central distribution plate and immediately was carried into the mold cavity by centrifugal force. After 45 seconds, the rotation was stopped and after an additional 4.25 minutes, the mold was removed from the centrifugal carrier, opened and the tire was easily removed from the cavity. The 435 gram tire was cut and visually inspected. A clearly defined 1-2 mm thick skin was noted around the tread portion and a 0.5-1 mm skin was observed along the side wall portion of the outer surface of the tire in addition to a lower density core present in the inner portion of the tire. The hardness of the tread portion was Shore A 75 and the sidewall portion was Shore A 55A. The core hardness was Shore A 30 and had a specific gravity of 0.33 gm/ml. The overall specific gravity of the tire was measured to be 0.39 gm/ml as compared to the free rise density of 0.24 gm/ml. This tire was allowed to cure for 48 hours at room temperature and mounted on a suitable rim and test ridden. The resulting ride was similar to a standard water blown polyurethane microcellular tire. These tires possess extended wear properties due to increased skin thickness.

EXAMPLE 21

88 parts of a 4500 molecular weight polypropylene triol capped with 18 weight percent ethylene oxide was blended with 12 parts of 1,4 Butanediol. In addition 8.6 parts of Expancel 551 DU, 0.13 parts of an aryl mercuric material and 0.07 parts of dibutytindilaurate were added. This mixture was thoroughly blended at 25° C. 72 parts of a polyester based MDI quasi prepolymer, NCO content 18.6% was then added and the entire mixture thoroughly agitated for 30 seconds. The free rise foam, which was tack-free in 2 minutes, had a density of 0.47 gm/ml.

The experiment was repeated using a larger batch size, this time 1100 g of the final mixture was poured into a polyurethane mold, spinning at 350 RPM, at a temperature of 70° C., configured with a bicycle tire shaped cavity having a volume of 2200 ml. The resulting tire had a density of approximately 0.50 gm/ml. Upon visual inspection the amount of skin on the exterior of the tire was less than 0.5 mm.

EXAMPLE 22

Example 21 above was repeated except that instead of using 8.6 parts of Expancel 551 DU spheres, a mixture of 4.3 parts of 551 DU spheres and 4.3 parts of 820 DU spheres were added. This time the free rise density was 0.35 gm/ml. The batch size was increased as before and the mold temperature reduced to 60° C. After pouring 1080 grams into the cavity the tire was removed easily after several minutes and was found to have a density of 0.48 gm/ml. The tire was cut through and visually examined. A fine celled core foam was observed surrounded by a 1–1.5 mm skin on the exterior of the molded tire surface. This tire would exhibit superior road wearing characteristics due to the relatively tough non-cellular skin.

Those skilled in the art will appreciate that the present invention may be embodied in other specific forms without departing from the spirit of central attributes thereof. In that the foregoing description of the present invention discloses only preferred embodiments thereof, it is to be understood that other variations are contemplated as being within the scope of the present invention. Accordingly, the present invention is not limited to particular embodiments which have been described in detail herein. Rather, reference should be made to the appended claims as indicated in the scope and content of the present invention.

What is claimed is:

1. A process for preparing microcellular structures having substantially non-cellular skins comprising:
providing a non-aqueous reactive polymer-forming system;
suspending in said polymer-forming system a material which functions as a combined nonaqueous blowing agent and release agent, said material consisting of a plurality of thermoplastic microspheres encapsulating a volatile material and wherein no additional blowing agents and/or release agents are included; said microspheres having a diameter of about 5 μm to 15 μm and an expansion initiation temperature of about 80° C. to 130° C.;
contacting at least a portion of said plurality of thermoplastic microspheres with a shaping surface at a temperature between about 40% and 90% of said expansion initiation temperature; and
polymerizing said reactive polymer-forming system in which said plurality of thermoplastic microspheres is suspended, to produce a microcellular structure having a substantially non-cellular skin which is readily released from said shaping surface.

2. The process of claim 1 wherein said thermoplastic microspheres comprise a mixture of at least two types of thermoplastic microspheres exhibiting different physical characteristics.

3. The process of claim 1 wherein said volatile material is a halogenated organic material.

4. The process of claim 3 wherein said halogenated organic material is a low boiling point halogenated hydrocarbon.

5. The process of claim 1 wherein said volatile material is a nonhalogenated, low boiling point hydrocarbon.

6. The process of claim 5 wherein said non-halogenated, low boiling point hydrocarbon is a member selected from the group consisting of isobutane and isopentane.

7. The process of claim 1 wherein said reactive polymer-forming system is polymerizable to form a polymer selected from the group consisting of polyurethanes, polyisocyanurates, polyurethaneureas, polycaprolactams, polyureas, polyesters, vinyl esters, silicones, acrylics, polyacrylates, polymethacrylates, polycyclopentadienes, polyvinyl chlorides, phenolic resins, urea-formaldehyde resins, epoxy resins, and combinations thereof.

8. The process of claim 1 wherein said thermoplastic microspheres are unexpanded.

9. The process of claim 1 wherein said thermoplastic microspheres comprise approximately 0.05% to 25% by weight of the suspension.

10. The process of claim 1 wherein said thermoplastic microspheres comprise approximately 0.1% to 10% by weight of the suspension.

11. The process of claim 1 wherein the temperature at which said portion of said plurality of thermoplastic microspheres contacts said shaping surface is a temperature between about 60% and 80% of said expansion initiation temperature.

12. The process of claim 1 wherein said thermoplastic microspheres comprise a polymer selected from the group consisting of polyvinylidene chloride copolymers, polypropylenes, acrylonitrile-butadiene-styrene copolymers, polyethylenes, polyamides, and polystyrenes.

13. The process of claim 1 wherein said volatile material is isobutane and said thermoplastic microspheres comprise polyvinylidene chloride-acrylonitrile copolymers.

14. A microcellular structure prepared by the process of claim 1.

15. A microcellular structure prepared by the process of claim 11.

16. A tire formed by the process of claim 1 having a microcellular core and a substantially non-cellular integral skin.

17. The tire of claim 16 wherein said tire is a bicycle tire.

18. The tire of claim 16 wherein said tire is a wheel chair tire.

19. A sole for a shoe produced according to the process of claim 1 having a microcellular core and a substantially non-cellular integral skin.

20. A household fixture produced according to the process of claim 1.

21. The household fixture of claim 20 wherein said household fixture is a member selected from the group consisting of a sink, a shower tray, a counter top, a tile, a bathtub and a toilet.

22. A transportation vehicle part produced according to the process of claim 1.

23. The transportation vehicle part of claim 22 wherein the transportation vehicle is a member selected from the group consisting of automobiles, off-road vehicles, aircraft, marine craft and rail craft.

24. The transportation vehicle part of claim 23 wherein the transportation vehicle is an automobile and said automotive part is a member selected from the group consisting of a dashboard, an armrest, an engine component, a fender, a vehicle body component, a structural component, a suspension component, a steering wheel, and a seat.

* * * * *